United States Patent
Leyva

(10) Patent No.: US 10,207,780 B2
(45) Date of Patent: Feb. 19, 2019

(54) EMERGENCY RESCUE LOCATOR

(71) Applicant: Ben Leyva, Torrance, CA (US)

(72) Inventor: Ben Leyva, Torrance, CA (US)

( * ) Notice: Subject to any disclaimer, the term of this patent is extended or adjusted under 35 U.S.C. 154(b) by 0 days.

(21) Appl. No.: 15/444,307

(22) Filed: Feb. 27, 2017

(65) Prior Publication Data

US 2017/0247091 A1   Aug. 31, 2017

Related U.S. Application Data

(60) Provisional application No. 62/300,187, filed on Feb. 26, 2016.

(51) Int. Cl.
| | |
|---|---|
| *B63C 9/20* | (2006.01) |
| *B63C 9/125* | (2006.01) |
| *G01S 5/16* | (2006.01) |
| *G08B 21/08* | (2006.01) |
| *B63C 9/08* | (2006.01) |

(52) U.S. Cl.
CPC .............. *B63C 9/20* (2013.01); *B63C 9/1255* (2013.01); *G01S 5/16* (2013.01); *G08B 21/088* (2013.01); *B63C 2009/084* (2013.01)

(58) Field of Classification Search
CPC .. B63C 9/21; B63C 9/20; B63C 9/115; B63C 2009/084; A01K 27/002
See application file for complete search history.

(56) References Cited

U.S. PATENT DOCUMENTS

| | | | | |
|---|---|---|---|---|
| 4,598,661 A | * | 7/1986 | Roe | B63C 9/20 116/173 |
| 4,725,253 A | * | 2/1988 | Politte | A47C 15/006 441/130 |
| 5,257,954 A | * | 11/1993 | Mullisen | B63C 9/20 441/118 |
| 6,332,424 B1 | * | 12/2001 | Frink | B63C 11/26 116/210 |
| 2008/0045100 A1 | * | 2/2008 | Dungan | B63C 9/20 441/89 |

* cited by examiner

*Primary Examiner* — Andrew Polay
(74) *Attorney, Agent, or Firm* — Ruth Eure

(57) ABSTRACT

An emergency rescue locator for locating persons and pets in the water is provided. The emergency rescue locator comprises a life jacket having a front side and a rear side and a locating system mounted to the life jacket. The locating system comprises an inflatable pole having a first end and a second end and an inflating mechanism in fluid communication with the first end of the pole. Upon the locating system becoming immersed in the water, the inflating mechanism instantly and automatically activates to inflate the pole causing the second end of the pole to be positioned at a point above a water surface. The locating system immediately and continuously pinpoints the persons' or pets' location until rescued.

3 Claims, 2 Drawing Sheets

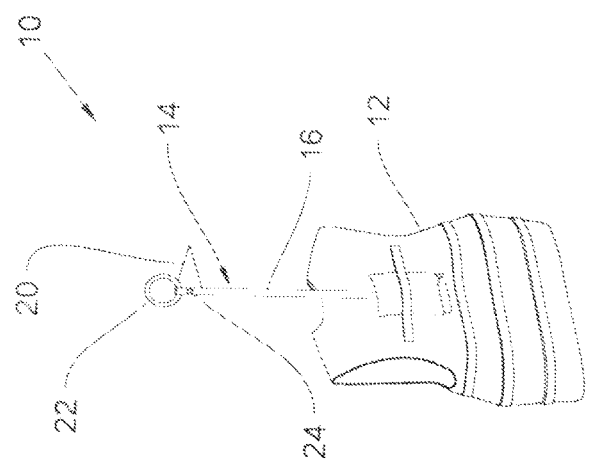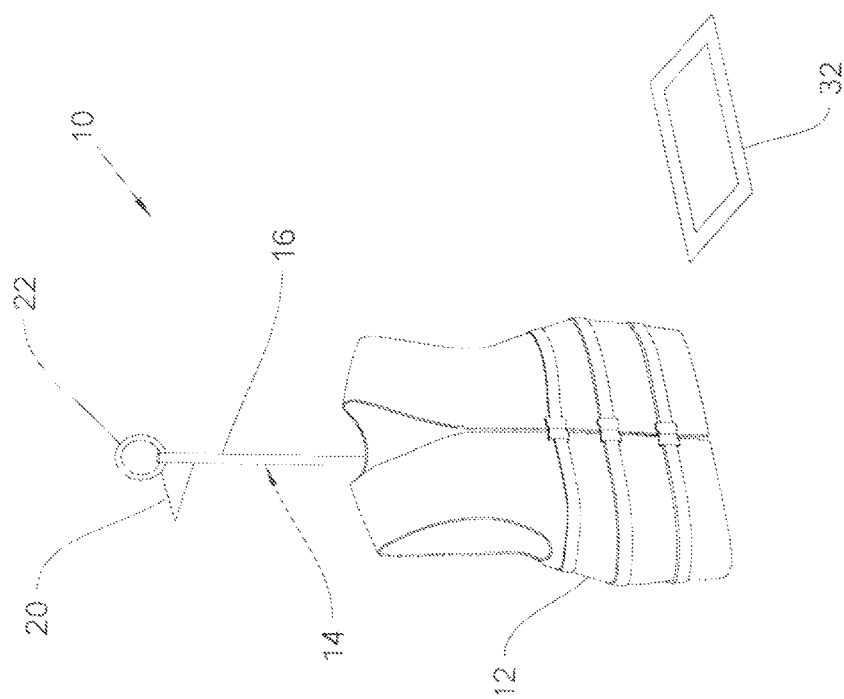

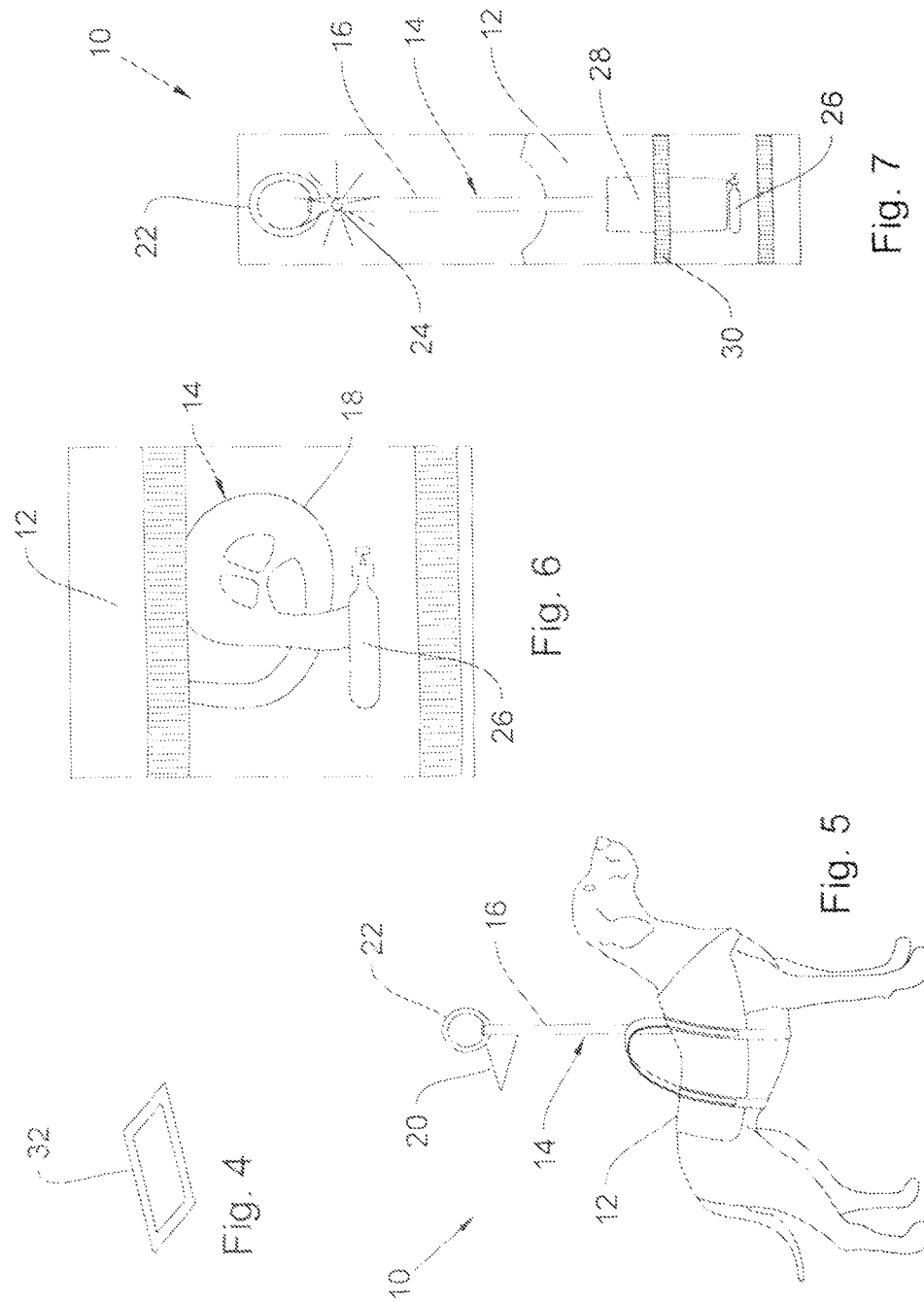

EMERGENCY RESCUE LOCATOR

CLAIM OF PRIORITY

This patent application claims priority under 35 USC 119 (e) (1) from U.S. Provisional patent application Ser. No. 62/300,187 filed Feb. 26, 2016, of common inventorship herewith entitled, "Emergency Rescue Locator for Boaters," which is incorporated herein by reference as though the same were set forth in its entirety.

FIELD OF THE INVENTION

The present invention pertains to the field of water safety devices, and more specifically to the field of rescue devices for people fallen into bodies of water.

BACKGROUND OF THE INVENTION

In a typical year, the Coast Guard records approximately forty eight hundred accidents, seven hundred deaths, thirty three hundred injuries and upwards of fifty million dollars in damage to property as a result of recreational boating accidents. Over two thirds of all fatal boating accident victims drown and of those victims, approximately ninety percent, neglected to wear a life jacket. Even when wearing a life jacket, however, a person or pet overboard can be very difficult for a boater to recover. The reason is that once a passenger leaves a boat for the water, they're very hard to see. In drills concerning a man overboard, one member of the boat's crew has the one duty, and one duty only, of keeping his or her eyes on the crew member who's gone overboard, continuously maintaining visual contact until that crew member is back on board.

The prior art has put forth several designs for rescue devices for people fallen into bodies of water Among these are:

U.S. Patent Publication 2012/0178319 to Ross Spencer describes a marine safety device for deployment in water upon unwanted entry by a person into the water to indicate the location of and to provide buoyancy for that person. The assembly comprises a cover for retaining components of the device as an undeployed package, an inflatable mast having a proximal end which engages the cover and a distal free end, and means for inflation of the inflatable member upon contact between the device and a body of water. A weight is located at or near the proximal end of the inflatable member to bias the inflatable member to a generally upright position. The device further comprises means to enable a person in the body of water to gain floatation from the assembly by means of at least one grippable member attached to the inflatable member. When deployed, the device sits in the body of water so that at least part of the inflatable member remains exposed to view above a top water level, thus enabling rescuers to pinpoint the location of the person in the water and enabling the person in the water to use the inflatable member as a buoyant safety device.

U.S. Pat. No. 5,893,788 to Steven R. Stevens describes an automatic, telescoping, buoyant identification device for use with a water sports life vest that has a conventional life vest and flotation device that is equipped with a telescoping spotting pole or flag mounted to the back of the vest. Constructed of a buoyant foam, the spotting pole slides freely within a tubular main housing such that the spotting pole automatically telescopes from the main housing into the air when the wearer becomes submerged in water. The spotting pole has a visible identification device such as a flag, mounted on its end. The identification device is colored in a manner such that it is highly visible to approaching boaters. The device is attachable to existing life vests using fastening devices, such as hook and loop fasteners, ties or belts. The spotting pole and main housing is manufactured of a material selected from the group comprising plastic and foam.

U.S. Pat. No. 4,30,143 to Larry L. Simms, Steve P. Moisen and Norbert C. Cupp describes a system which automatically or manually senses and signals the event of a person falling overboard from a vessel into water. A portable transmitter is coupled to a sound producing transducer that is carried by the person and transmits ultrasonic or audible sound waves through the water to a receiver carried by the vessel The receiver thereby initiates rescue operations for the person who has fallen overboard.

None of these prior art references describe the present invention.

SUMMARY OF THE INVENTION

It is an object of the present invention to provide a personal emergency rescue locator used by boaters which activates on immersion in water and functions to pinpoint the individual's location by means of a flashing LED beacon and an inflatable six foot flag that glows in the dark.

The present invention is an emergency rescue locator for locating persons and pets in the water. The emergency rescue locator comprises a life jacket having a front side and a rear side and a locating system mounted to the life jacket. The locating system comprises an inflatable pole having a first end and a second end and an inflating mechanism in fluid communication with the first end of the pole. Upon the locating system becoming immersed in the water, the inflating mechanism instantly and automatically activates to inflate the pole causing the second end of the pole to be positioned at a point above a water surface. The locating system immediately and continuously pinpoints the persons' or pets' location until rescued.

In addition, the present invention includes a method for locating persons and pets in the water. The method comprises providing a life jacket having a front side and a rear side, mounting a locating system to the life jacket with the locating system comprising an inflatable pole having a first end and a second end and an inflating mechanism in fluid communication with the first end of the pole immersing the locating system in the water, instantly and automatically activating the inflating mechanism, inflating the pole, raising the second end of the pole to a point above a water surface, and immediately and continuously pinpointing the persons' or pets' location until rescued.

The present invention further includes an emergency rescue locator for locating persons and pets in the water. The emergency rescue locator comprises a life jacket having a front side and a rear side and a locating system mounted to the life jacket. The locating system comprises an inflatable pole having a first end and a second end, a flag mounted to the second end of the pole, a finial ring mounted to the second end of the pole, a flashing LED beacon mounted to the second end of the pole, and an inflating mechanism in fluid communication with the first end of the pole. Upon the locating system becoming immersed in the water, the inflating mechanism instantly and automatically activates to inflate the pole causing the second end of the pole, the flag, the finial ring, and the LED beacon to be positioned at a point above a water surface. The locating system immediately and continuously pinpoints the persons' or pets' location until rescued.

BRIEF DESCRIPTION OF THE DRAWINGS

FIG. 1 is a front perspective view illustrating an emergency rescue locator, constructed in accordance with the present invention, inflated from the backside of a life jacket.

FIG. 2 is a perspective view illustrating a peel and stick signal flag of the emergency rescue locator, constructed in accordance with the present invention, attachable to the side of the boat searching for the missing person or pet FIG. 3 is a rear perspective view illustrating the emergency rescue locator of FIG. 1, constructed in accordance with the present invention, inflated from the backside of the life jacket.

FIG. 4 is a perspective view illustrating the peel and stick signal flag of FIG. 2 of the emergency rescue locator, constructed in accordance with the present invention, attachable to the side of the boat searching for the missing person or pet.

FIG. 5 is a perspective view illustrating another embodiment of the emergency rescue locator, constructed in accordance with the present invention, for pots and other animals.

FIG. 6 is a perspective view illustrating an activation mechanism of the emergency rescue locator constructed in accordance with the present invention, with the activation mechanism being in an undeployed state and stored on the backside of the life jacket.

FIG. 7 is a perspective view illustrating a water-activated LED beacon light of the emergency rescue locator, constructed in accordance with the present invention.

DETAILED DESCRIPTION OF THE INVENTION

The present invention, hereinafter referred to as an Emergency Rescue Locator indicated generally at 10, is a personal emergency rescue locator usable by boaters which activates on immersion in water and functions to pinpoint the individual's location. Fastening to a life jacket 12 and inflating automatically when a crew member falls overboard into water the Emergency Rescue Locator 10 provides an essential ingredient in successfully recovering a man, woman, child or pet by providing immediate visibility of the person or pet in the water. Basically, the Emergency Rescue Locator 10 is an accessory safety device intended for use in conjunction with a life jacket 12.

The Emergency Rescue Locator 10 of the present invention includes the life jacket 12 having a front side and a rear side and a locating system 14 mounted to the life jacket 12. In a preferred embodiment, the locating system 14 is mounted to the rear side of the life jacket 12 although it is within the scope of the present invention to mount the locating system 12 to the front side or the sides of the life jacket 12.

It should be noted that while the life jacket 12 for use with the Emergency Rescue Locator 10 of the present invention has been described and illustrated as a particular type and style of life jacket 12, it is within the scope of the present invention for the life jacket 12 to be any type or style and should not be limited by the drawings and descriptions herein.

The locating system 14 of the Emergency Rescue Locator 10 of the present invention includes an inflatable pole 16 having a first end and a second end. The first end of the pole 16 comprises a broad circular base 18 and is mounted to the life jacket 12. Preferably, the pole 16 has an inflated length of approximately six (6') feet although having a pole 16 with a length greater than or lesser than approximately six (6') feet is within the scope of the present invention. The pole 16 is preferably constructed in a high visibility color such as yellow or orange color with bright reflective wraparound panels.

In addition, the locating system 14 of the Emergency Rescue Locator 10 of the present invention includes a flag 20 mounted to the second end of the pole 16. The flag 20 is preferably constructed in a high visibility color such as red. A sturdy finial ring 22 is mounted to the second end of the pole beyond the flag 20 that is seizable by a boathook or by hand. Furthermore, it is preferable that the pole 16 and/or flag 20 glows in the dark.

The locating system 14 of the Emergency Rescue Locator 10 of the present invention additionally includes a flashing LED beacon 24 mounted to the second end of the pole 16 nearingly adjacent the flag 20 and the ring 22. The beacon 24 is preferably a battery powered, brightly flashing, and automatically activated LED strobe light 24 although any type of beacon light 24 is within the scope of the present invention.

Furthermore, the locating system 14 of the Emergency Rescue Locator 10 of the present invention includes an inflating mechanism 26 fluidly connected to the first end of the inflatable pole 16. Preferably, the inflating mechanism 28 is a carbon dioxide or $CO_2$ cylinder, allowing quick, almost instantaneous inflation of the pole 16 although having a different type of Inflating mechanism 26 is within the scope of the present invention.

The locating system 14, in the deflated condition, of the Emergency Rescue Locator 10 of the present invention is a compact device that is contained in its own mesh fabric pouch or pocket 28. The mesh pouch 28 preferably fastens to the back top shoulder portion of the life jacket 12 (or anywhere else on the life jacket 12 as desired by the manufacturer and/or user). Preferably, the mesh pouch 28 is mounted to the life jacket 12 by means of a belt 30 which goes around the entire life jacket 12 or through the arm holes, and then fastens by means of mating hook and loop ends. As will be understood by those persons skilled in the art, the actual mounting of the locating system 14 to the life jacket 12 will be dependent on the type and style of life jacket 12 and can include mechanical fasteners such as, but not limited to, snaps, buttons, hooks, hook and loop fasteners, welds, etc. The inflating mechanism 26, i.e., a carbon dioxide or CO2 cylinder, the inflatable pole 16, and the flag 20 are securely but somewhat loosely within the mesh pouch 28 by preferable means of a tuck in flap or tab closure, such that the locating system 14 remains in the mesh pouch 28 during the course or a boater's normal motions, yet easily exits the mesh pouch 28 when the boater and life jacket hit the water.

The inflation of the locating system 14 of the Emergency Rescue Locator 10 of the present invention is water activated, during which a single use, inflating mechanism 28 of carbon dioxide or CO2 cylinder provides the gas for inflating the pole 16 and thereby raising the flag 20 and beacon light 24 above the water surface for rescue. The entire inflation process occurs almost instantaneously once the user is in the water. A peel and stick signal flag 32 can be attached to the boat to let other boaters and persons that a search is being conducted for a missing person or pet. The Emergency Rescue Locator 10 effectively functions to immediately and continuously pinpoint the individual's location until the victims are rescued.

Inflating instantly and automatically the moment a person falls over board and hits the water, the Emergency Rescue Locator 10 of the present invention provides high and continuous visibility through its bright and flashing rescue locator. The location of the fallen person is easily sighted and visual contact is maintained throughout the rescue. Lightweight and compact, the Emergency Rescue Locator 10 fastens quickly and securely to a life jacket 12 and is barely noticeable to a wearer unless and until they need it. The Emergency Rescue Locator 10 makes implementing safety procedures a simple task for the entire family and their guests and pets. Durably constructed of high quality materials, the Emergency Rescue Locator 10 will withstand many years of continued use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. An emergency rescue locator for locating persons and pets in the water, the emergency rescue locator comprising:
   a life jacket having a front side and a rear side; and
   a locating system mounted to the life jacket, the locating system comprising:
   an inflatable pole having a first end and a second end; and
   an inflating mechanism in fluid communication with the first end of the pole;
   wherein upon the locating system becoming immersed in the water, the inflating mechanism automatically activates to inflate the pole causing the second end of the pole to be positioned at a point above a water surface; and
   wherein the locating system continuously pinpoints the persons' or pets' location until rescued;
   and
   wherein the locating system is secured to the rear side of the life jacket; and
   wherein the first end of the pole has a circular base mounted directly to the life jacket:
   and
   wherein the pole is in yellow or orange:
   and
   wherein
   reflective wraparound panels are wrapped around the pole.

2. The emergency rescue locator of claim 1 and further comprising:
   a flag mounted to the second end of the pole:
   wherein the flag is red or glows in the dark;
   and
   wherein a finial ring is mounted to the second end of the pole;
   and
   wherein a flashing LED beacon mounted to the second end of the pole;
   and
   wherein the beacon is a battery powered, flashing, and automatically activated LED strobe light automatically activated upon immersion of the locating system in the water;
   and
   wherein the inflating mechanism is a carbon dioxide or $CO_2$ cylinder and provides inflation of the pole:
   and
   wherein the locating system, in the deflated condition, is contained in a mesh fabric pouch or pocket fastened to the life jacket, the mesh pouch having a tuck in flap or tab closure;
   and
   wherein the mesh pouch fastens to a back top shoulder portion of the life jacket by means of a belt around the entire life jacket or through arm holes, and fastened by means of mating hook and loop ends;
   and further comprising:
   a peel and stick signal flag attachable to a search boat.

3. An emergency rescue locator for locating persons and pets in the water, the emergency rescue locator comprising:
   a life jacket having a front side and a rear side; and
   a locating system mounted to the life jacket, the locating system comprising:
   an inflatable pole having a first end and a second end;
   a flag mounted to the second end of the pole;
   a finial ring mounted to the second end of the pole;
   a flashing LED beacon mounted to the second end of the pole; and
   an inflating mechanism in fluid communication with the first end of the pole;
   wherein upon the locating system becoming immersed in the water, the inflating mechanism automatically activates to inflate the pole causing the second end of the pole, the flag, the finial ring, and the LED beacon to be positioned at a point above a water surface; and
   wherein the locating system continuously pinpoints the persons' or pets' location until rescued;
   and
   wherein the pole is yellow or orange and the flag is red;
   and
   wherein the beacon is a battery powered, flashing, and automatically activated LED strobe light automatically activated upon immersion of the locating system in the water;
   and
   wherein the locating system, in the deflated condition, is contained in a mesh fabric pouch or pocket fastened to the life jacket, the mesh pouch having a tuck in flap or tab closure;
   and
   wherein the mesh pouch fastens to a back top shoulder portion of the life jacket by means of a belt around the entire life jacket or through arm holes, and fastened by means of mating hook and loop ends.

* * * * *